US011403766B2

(12) United States Patent
Wei et al.

(10) Patent No.: US 11,403,766 B2
(45) Date of Patent: Aug. 2, 2022

(54) METHOD AND DEVICE FOR LABELING POINT OF INTEREST

(71) Applicant: BEIJING BAIDU NETCOM SCIENCE AND TECHNOLOGY CO., LTD., Beijing (CN)

(72) Inventors: Kai Wei, Beijing (CN); Yuning Du, Beijing (CN); Chenxia Li, Beijing (CN); Guoyi Liu, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 54 days.

(21) Appl. No.: 16/926,238

(22) Filed: Jul. 10, 2020

(65) Prior Publication Data

US 2021/0090266 A1 Mar. 25, 2021

(30) Foreign Application Priority Data

Sep. 19, 2019 (CN) .......................... 201910885598.X

(51) Int. Cl.
*G06T 7/187* (2017.01)
*G06T 7/136* (2017.01)
(Continued)

(52) U.S. Cl.
CPC ............ *G06T 7/187* (2017.01); *G06T 7/0002* (2013.01); *G06T 7/136* (2017.01); *G06T 7/174* (2017.01);
(Continued)

(58) Field of Classification Search
CPC ......... G06T 7/187; G06T 7/136; G06T 7/174; G06T 7/0002; G06T 2207/20221;
(Continued)

(56) References Cited

U.S. PATENT DOCUMENTS

2013/0328926 A1* 12/2013 Kim ................. H04N 5/232933
345/633
2020/0110966 A1* 4/2020 Revaud ................ G06K 9/4628

FOREIGN PATENT DOCUMENTS

CN 104376118 A 2/2015
CN 105989092 A 10/2016
(Continued)

OTHER PUBLICATIONS

Office Action for Japanese Application No. 2020-082432, dated Jun. 8, 2021, 3 pages.
(Continued)

*Primary Examiner* — Zhitong Chen
(74) *Attorney, Agent, or Firm* — Fay Sharpe LLP

(57) ABSTRACT

Embodiments of the present disclosure provide a method and device for labelling a point of interest, a computer device, and a storage medium. The method includes the following. Image data to be labelled is obtained. The image data includes an image to be labelled and a collection location of the image to be labelled. Feature extraction is performed on the image to be labelled to obtain a first image feature of the image to be labelled. A first reference image corresponding to the image to be labelled is determined based on a similarity between the first image feature and a second image feature corresponding to each reference image in an image library. The point of interest of the image to be labelled is labelled based on a category of the first reference image and the collection location of the image to be labelled.

12 Claims, 3 Drawing Sheets

(51) Int. Cl.
  *G06T 7/174*    (2017.01)
  *G06T 7/00*     (2017.01)
  *G06V 10/46*    (2022.01)
  *G06V 10/25*    (2022.01)

(52) U.S. Cl.
  CPC ............ *G06V 10/25* (2022.01); *G06V 10/462* (2022.01); *G06T 2207/20221* (2013.01)

(58) Field of Classification Search
  CPC .... G06K 9/4671; G06K 9/342; G06K 9/6271; G06K 9/4628; G06K 9/3233; G06K 9/6215; G06N 3/08
  See application file for complete search history.

(56) References Cited

FOREIGN PATENT DOCUMENTS

| | | | |
|---|---|---|---|
| CN | 108694882 | A | 10/2018 |
| CN | 109062988 | A | 12/2018 |
| CN | 109726255 | A | 5/2019 |
| JP | 2005293367 | A | 10/2005 |
| JP | 2015501982 | A | 1/2015 |
| JP | 2015109024 | A | 6/2015 |
| JP | 2016045943 | A | 4/2016 |
| JP | 2016081271 | A | 5/2016 |
| JP | 2018518742 | A | 7/2018 |
| JP | 2019523925 | A | 8/2019 |

OTHER PUBLICATIONS

Office Action for Chinese Application No. 201910885598.X, dated Oct. 26, 2021, 8 pages.

\* cited by examiner

US 11,403,766 B2

METHOD AND DEVICE FOR LABELING POINT OF INTEREST

CROSS REFERENCE TO RELATED APPLICATIONS

This application claims priority and benefits to Chinese Application No. 201910885598.X, filed on Sep. 19, 2019, the entire content of which is incorporated herein by reference.

TECHNICAL FIELD

The present disclosure mainly relates to an image technology field, and more particularly, to a method and a device for labeling a point of interest, a computer device, and a storage medium.

BACKGROUND

POI (point of interest) information refers to specific information of each POI in navigation data, such as name, category, latitude and longitude, and image. The image information of the POI can often be used as important one of the POI information, for providing underlying information for various services.

SUMMARY

In embodiments of the present disclosure, a method for labelling a point of interest is provided. The method includes: obtaining image data to be labelled. The image data includes an image to be labelled and a collection location of the image to be labelled. The method further includes: performing feature extraction on the image to be labelled to obtain a first image feature of the image to be labelled; determining a first reference image corresponding to the image to be labelled based on a similarity between the first image feature and a second image feature corresponding to a reference image in an image library; and labeling the point of interest of the image to be labelled based on a category of the first reference image and the collection location of the image to be labelled.

In embodiments of the present disclosure, a computer device is provided. The computer device includes a processor and a memory. The processor is configured to run programs corresponding to executable program codes by reading the executable program codes stored in the memory, such that a method for labelling a point of interest according to the embodiment of the first aspect is implemented.

In embodiments of the present disclosure, a non-transitory computer-readable storage medium is provided. The non-transitory computer-readable storage medium has a computer program stored thereon. When the program is executed by a processor, a method for labelling a point of interest according to embodiment of the first aspect is implemented.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

The above and/or additional aspects and advantages of embodiments of the present disclosure will become apparent and more readily appreciated from the following descriptions, in which.

DETAILED DESCRIPTION

Figure 1:
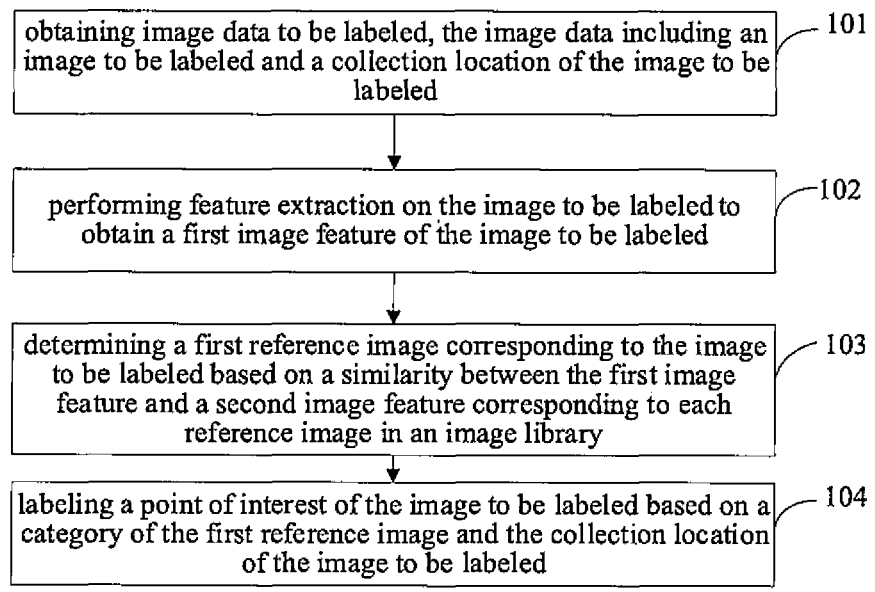
FIG. 1 is a flowchart illustrating a method for labelling a point of interest according to embodiments of the present disclosure.

Embodiments of the present disclosure are described in more detail below with reference to the accompanying drawings. The same or similar elements and the elements having same or similar functions are denoted by like reference numerals throughout the descriptions. It should be understood that the drawings and embodiments of the present disclosure are for exemplary purposes only, and are not intended to limit the protection scope of the present disclosure.

As discussed in the background of the present disclosure, how to obtain more POI images from an existing image has become one of the most interesting exploration points of this kind of services.

A conventional method for labeling POIs of an image is to label the POIs of the image to be labelled through a manual verification manner based on existing POI image categories. When there are various POI image categories, the labeling method through the manual verification manner is labor-consuming, time-consuming, and costly.

Therefore, the present disclosure provides a method and a device for labelling a point of interest, the computer device, and the storage medium, which will be described in more detail below with reference to the accompanying drawings.

With the method and device for labelling a point of interest, the computer device, and the storage medium according to embodiments of the present disclosure, by extracting the first image feature of the image to be labelled and determining the first reference image corresponding to the image to be labelled based on similarity between the first image feature and the second image feature corresponding to the reference image in the image library, the point of interest of the image to be labelled is labelled based on the category of the first reference image and the collection location of the image to be labelled. The method, the device, the computer device and the storage medium may determine, from the image library, the reference image of a known category corresponding to the image to be labelled based on the similarity between images, and automatically labels the category and location for the image to be labelled based on the category of the reference image and the collection location of the image to be labelled. Therefore, The method, the device, the computer device and the storage medium may not only improve labeling efficiency, but also label the collection location of the image to be labelled for subsequent map updates.

In view of a problem that a method for labelling POTS of an image through a manual verification manner existing in the related art is labor-consuming, time-consuming, and costly, embodiments of the present disclosure provide a method for labelling a point of interest. The method includes: determining, from an image library, a reference image of a known category corresponding to an image to be labelled, based on a similarity therebetween, and automatically labelling the image to be labelled based on the reference image of the known category. The method not only improves labeling efficiency, but also labels location information of the interest points, thereby improving labeling quality.

The method for labelling a point of interest according to embodiments of the present disclosure may be executed by a device for labelling a point of interest according to embodiments of the present disclosure. The device may be configured in a computer device to realize labeling the point of interest of the image to be labelled.

FIG. 1 is a flowchart illustrating a method for labelling a point of interest according to embodiments of the present disclosure.

As illustrated in FIG. 1, the method for labelling a point of interest (POI) may include the following.

At block 101, image data to be labelled is obtained. The image data may include an image to be labelled and a collection location of the image to be labelled.

In a practical application, generally, it is necessary to label the POI on the image data. A map may be drawn based on the image data that is labelled. For example, an electronic map is labelled with the POIs, such as stores, banks, or schools.

In embodiments, a user may upload a captured image to be labelled and a collection location of the image to be labelled. For example, the user photographs a picture of a certain street at a certain location to obtain the image to be labelled, and uploads the image and the collection location where the image is captured.

The image to be labelled may include a POI or multiple POIs. The collection location of the image to be labelled refers to a geographic location where the image to be labelled is captured, which may be latitude and longitude information obtained through a GPS (global positioning system), or a specific location on the street, such as number XX on the street.

At block 102, feature extraction is performed on the image to be labelled to obtain a first image feature of the image to be labelled.

In embodiments, the feature extraction may be performed on the image to be labelled through a pre-trained neural network model. In detail, the image to be labelled is input into the pre-trained neural network model, and features of the image to be labelled are extracted through the neural network model to obtain the first image feature.

Before performing the feature extraction, the neural network model may be trained using a large number of POI images. To improve accuracy of the neural network model, negative samples may be used during the training. The negative sample refers to a non-POI image, such as an image about a warning sign, a safety exit, and so on.

Further, in order to improve an anti-interference capability of the neural network model, the POI images used for training the neural network model may be processed, such as data augmentation or data color shading processing of the POI images, to enlarge the number of training samples. The POI images and the processed POI images may be used for training the neural network model, to enable the trained model has the anti-interference capability.

At block 103, a first reference image corresponding to the image to be labelled is determined based on a similarity between the first image feature and a second image feature corresponding to each reference image in an image library.

In embodiments, the image library may include one or more reference images. The reference image included in the image library may be a labelled image, and information such as the category and the collection location of the reference image may be recorded in the image library. The category may include, but not limited to, hospital, restaurant, shopping mall, amusement park, and residential community.

In detail, the neural network model for performing the feature extraction on the image to be labelled may be used to perform the feature extraction on each reference image in the image library to obtain the second image feature of each reference image. The similarity between the first image feature of the image to be labelled and the second image feature of each reference image in the image library may be calculated.

In detail, the distance between the first image feature of the image to be labelled and the second image feature of each reference image in the image library may be calculated. The similarity between the image to be labelled and each reference image in the image library may be indicated by the distance. The larger the distance is, the smaller the similarity is, and the smaller the distance is, the greater the similarity is.

Since the image library may include various types of reference images, the similarity between the second image feature of each reference image and the first image feature of the image to be labelled may be small. Therefore, after the similarity between the first image feature of the image to be labelled and the second image feature of each reference image is calculated, a preset similarity threshold is used to filter out the reference image having the similarity smaller than the preset similarity threshold. In detail, the reference image having the similarity greater than the similarity threshold is set as the first reference image.

It should be noted that one or more first reference image corresponding to the image to be labelled may be determined. Certainly, in the case that all similarities of the reference images included in the image library are less than the preset similarity threshold, no reference image similar to the image to be labelled exists in the image library.

At block 104, POIs of the image to be labelled are labelled based on a category of the first reference image and the collection location of the image to be labelled.

It may be determined that the image to be labelled is of the same category as the first reference image, since the similarity between the first reference image and the image to be labelled is greater than the preset similarity threshold. For example, the categories of the image to be labelled and the first reference image are both restaurants or hospitals. Therefore, the category of the first reference image may be used to label the category of the image to be labelled.

In the case that only one first reference image exists, the image to be labelled may be labelled with the category of the first reference image and the collection location of the image to be labelled.

In the case that multiple first reference images exist, the category corresponding to a maximum number of images may be used as a candidate category, and the image to be labelled may be labelled with the candidate category and the collection location of the image to be labelled. For example, four first reference images exist and the categories of the four first reference images are A, A, A, B, respectively. The candidate category may be determined to be A, and the category of the image to be labelled may be labelled as A.

In embodiments, in addition to the category, the image to be labelled is labelled with the collection location. The POI of the same category but at different locations may be distinguished based on the collection location. For example, chain stores may be distinguished from each other based on the collection location. The collection location may be used for map update. In a practical application, an image of a POI included in the image to be labelled captured by the user may be a part of the image to be labelled. The image to be labelled may include multiple POIs. In order to improve labeling efficiency, before the feature extraction is performed on the image to be labelled, a candidate labelled region may be determined from the image to be labelled, and the feature extraction is performed on the candidate labelled region. The following description is made with reference to FIG. 2, FIG. 2 is another flowchart illustrating a method for labelling a point of interest according to embodiments of the present disclosure.

Figure 2:
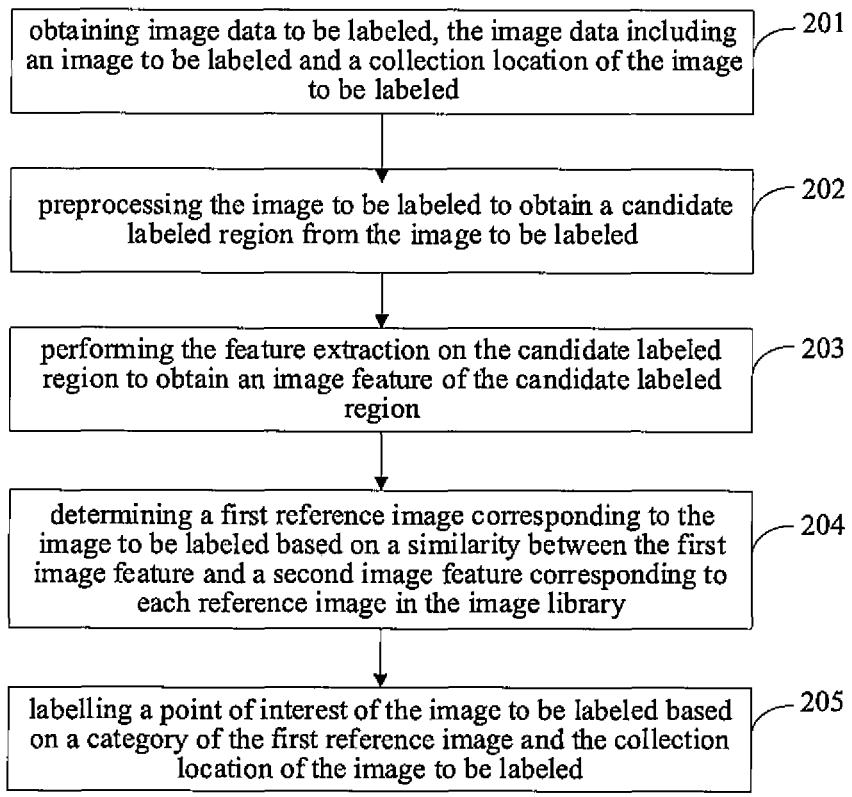
FIG. 2 is another flowchart illustrating a method for labelling a point of interest according to embodiments of the present disclosure.

As illustrated in FIG. 2, the method for labelling a point of interest may include the following.

At block 201, the image data to be labelled is obtained. The image data may include an image to be labelled and a collection location of the image to be labelled.

In embodiments, the block 201 is similar to the block 101 as described above, and details are not described herein again.

At block 202, the image to be labelled is preprocessed to obtain a candidate labelled region from the image to be labelled.

In embodiments, a detection and tailoring operation may be performed using a pre-trained POI recognition model to obtain the candidate labelled region from the image to be labelled.

The POI recognition model may be trained as follows. A set of sample images are obtained. Each sample image of the set may have respective labels of target location for each labelled region. Each sample image is input to an initial neural network model to obtain a predicted location of each labelled region output by the initial neural network model. The initial neural network model may be corrected based on a difference between the predicted location and the target location to generate the POI recognition model.

In detail, by inputting the image to be labelled to the POI recognition model and by obtaining the candidate labelled regions through the tailoring operation performed by the POI recognition model, not only the non-POI may be filtered out from the image to be labelled, but also labeling accuracy and efficiency are improved. It should be noted that the image to be labelled may include one or more candidate labelled regions.

At block 203, the feature extraction is performed on the candidate labelled region to obtain an image feature of the candidate labelled region.

After the candidate labelled region is obtained, the feature extraction is performed on the candidate labelled region. In detail, the pre-trained neural network model may be used to extract features of the candidate labelled region.

In the case that multiple candidate labelled regions are included in the image to be labelled, the feature extraction may be performed on each candidate labelled region to obtain the image feature of each candidate labelled region.

At block 204, the first reference image corresponding to the image to be labelled is determined based on similarity between the first image feature and second image feature corresponding to the reference image in an image library.

In embodiments, the similarity between the image feature of the candidate labelled region and the second image feature of each reference image in an image feature database may be calculated, and the first reference image of the candidate labelled region may be determined based on the similarity. The specific process is similar to the above-mentioned manner for determining the first reference image corresponding to the image to be labelled, which is not repeated here.

In the caser that the image to be labelled includes multiple candidate labelled regions, the first reference image corresponding to each candidate labelled region may be determined.

At block 205, the POI of the image to be labelled is labelled based on the category of the first reference image and the collection location of the image to be labelled.

In embodiments, when one first reference image corresponds to the candidate labelled region, the candidate labelled region may be labelled with the category of the first reference image and the collection location of the image to be labelled. When one or more first reference images correspond to the candidate labelled region, the category to which a maximum number of images correspond may be used as the candidate category, and the candidate labelled region may be labelled with the candidate category and the collection location of the image to be labelled.

When there are multiple candidate labelled regions, the image to be labelled may be labelled based on the category of the first reference image corresponding to each candidate labelled region and the collection location of the image to be labelled. In detail, each candidate labelled region included in the image to be labelled may be labelled with the category and the collection location of the image to be labelled. Certainly, each candidate labelled region may be labelled with the category and collection location.

It may be understood that the collection location of the entire image to be labelled is same. When the image to be labelled includes multiple POIs, the collection locations corresponding to these POIs are same to each other.

In embodiments of the present disclosure, before the feature extraction is performed on the image to be labelled, the image to be labelled may be pre-processed, such as tailored or cut, to obtain the candidate labelled region from the image to be labelled. The feature extraction may be performed on the candidate labelled region, and the POI of the candidate labelled region may be labelled, thereby not only improving labeling efficiency, but also improving labeling accuracy.

In a practical application, at least two candidate labelled regions may be overlapped to each other. In the case that two candidate labelled regions are greatly overlapped, it is possible that the two candidate labelled regions may be images of the same POI.

In order to improve labeling accuracy, in embodiments of the present disclosure, in the case that the image to be labelled includes at least two candidate labelled regions, and a first candidate labelled region is overlapped with a second candidate labelled region, before the feature extraction is performed on the image to be labelled, it may be determined whether a first ratio of an area of the overlapped region to an area of the first candidate labelled region is greater than a threshold, and/or whether a second ratio of the area of the overlapped region to an area of the second candidate labelled region is greater than a threshold.

When the first ratio is greater than the threshold or the second ratio is greater than the threshold or both the first ratio and the second ratio are greater than the threshold, the first candidate labelled region and the second candidate labelled region are fused to obtain a fused candidate labelled region, such that the fused candidate labelled region includes both the first candidate labelled region and the second candidate labelled region. The feature extraction is performed on the fused candidate labelled region.

In embodiments of the present disclosure, in the case that two candidate labelled regions included in the image to be labelled are overlapped to each other, it is determined whether the ratio of the area of the overlapped region to areas of the two candidate labelled regions meets a fusion condition. When the fusion condition is met, the fusion operation is performed, and the feature extraction is performed on the fused candidate labelled region, thereby improving labeling accuracy and efficiency.

In the case that three or more candidate labelled regions are overlapped, it may be determined whether two candidate labelled regions meet the fusion condition. If yes, the fusion operation is performed. After that, it may be determined whether the fused candidate labelled region and one of remaining candidate labelled regions satisfy the fusion condition. If yes, the fusion operation is performed. And then, it may be determined whether the fused candidate labelled region and one of the remaining candidate labelled regions satisfy the fusion processing condition, the above process is repeated until all overlapped candidate labelled regions are fused.

In order to improve labeling efficiency, in embodiments of the present disclosure, after the POI of the image to be labelled is labelled, the category and the collection location of the image to be labelled may be recorded in the image library, so as to enlarging the number of reference images of the image library, thereby facilitating subsequent labeling of the image to be labelled.

Figure 3:
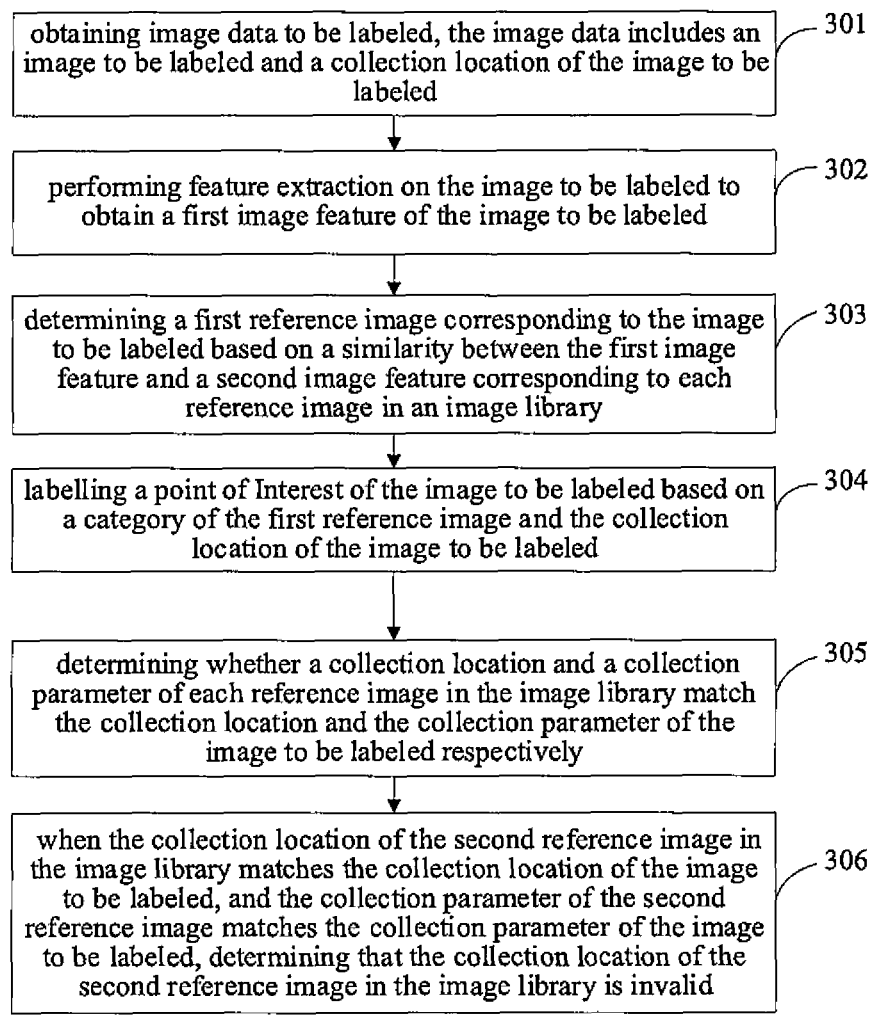
FIG. 3 is still another flowchart illustrating a method for labelling a point of interest according to embodiments of the present disclosure.

In a practical application, changes may occur to a POI at a certain location. For example, a barber shop may change to a restaurant. In order to determine in time whether the collection location of the reference image in the image library is valid, the following description is made with reference to FIG. 3. FIG. 3 is still another flowchart illustrating a method for labelling a point of interest according to embodiments of the present disclosure.

In embodiments, in addition to the image to be labelled and the collection location of the image to be labelled, the acquired image data to be labelled may further include collection parameters, such as a collection angle and a collection device. The collection angle may be an angle indicating that the photographed object is right in front of the collection device or that the photographed object is located obliquely in front of the collection device, and the like. The collection device may refer to a model of a device for collecting the image to be labelled.

As illustrated in FIG. 3, the method for labelling a point of interest may include the following.

At block 301, the image data to be labelled is obtained, The image data includes the image to be labelled and the collection location of the image to be labelled.

At block 302, the feature extraction is performed on the image to be labelled to obtain the first image feature of the image to be labelled.

At block 303, the first reference image corresponding to the image to be labelled is determined based on the similarity between the first image feature and the second image feature corresponding to the reference image in the image library.

At block 304, the point of interest of the image to be labelled is labelled based on the category of the first reference image and the collection location of the image to be labelled.

In embodiments, the blocks 301 to 304 are similar to the above-described blocks 101 to 104, which are not repeated here.

At block 305, it is determined whether a collection location and a collection parameter of each reference image in the image library match the collection location and the collection parameter of the image to be labelled respectively.

In order to determine whether the image library includes a reference image having the same collection location and collection parameter as the image to be labelled, after the point of interest of the image to be labelled is labelled, the collection location of each reference image in the image library is compared with the collection location of the image to be labelled, and the collection parameter of each reference image in the image library is compared with the collection parameter of the image to be labelled, to determine whether the collection location and collection parameter of each reference image match the collection location and collection parameter of the image to be labelled, respectively.

For example, it is determined whether the collection location of each reference image in the image library is same as the collection location of the image to be labelled based on a determination whether the collection angle of each reference image matches the collection angle of the image to be labelled. For example, it is determined whether a difference between the collection angle of the reference image and the collection angle of the image to be labelled is less than a preset angle threshold.

At block 306, when the collection location of the second reference image in the image library matches the collection location of the image to be labelled, and the collection parameter of the second reference image matches the collection parameter of the image to be labelled, it may be determined that the collection location of the second reference image in the image library is invalid.

In embodiments, when the collection location of the second reference image in the image library matches the collection location of the image to be labelled, and the collection parameter of the second reference image matches the collection parameter of the image to be labelled, it indicates that the POI contained in images successively captured at the same collection location and at the same collection angle are different from each other. Therefore, it may be determined that the collection location of the second reference image in the image library is invalid and the second reference image captured at the collection location is invalid. In the image library, the collection location of the second reference image may be recorded as invalid, or the second reference image may be deleted from the image library.

After it is determined that the collection location of the second reference image is invalid, the similarity between the image to be labelled and the second reference image may be determined. When the similarity is relatively low, it may indicate that the POI included in the image to be labelled is different from that included in the second reference image.

As an application scenario, the POT in a map may be updated in real-time through the above-mentioned method for labelling the POI. In detail, when the image library includes the reference image having the collection location and collation parameter matching that of the image to be labelled, the POI at the collection location in the map may be updated based on the image to be labelled. For example, when the POI contained in images successively captured at the same location, at the same angle and with same collection parameter are different, the POI in the map may be updated according to the POI in a later captured image.

For example, stores A, B, and C exist near a certain geographical location on the map. When a new POI D is identified with the solution according to embodiments of the present disclosure, it may be understood that the new POI D is near the geographical location, such that it needs to update the POI near the geographic location on the map. Further, whether to replace A, B or C with D or to add a new D may be implemented by another method.

Figure 4:
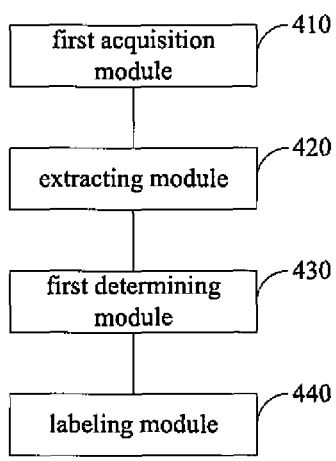
FIG. 4 is a block diagram illustrating a device for labelling a point of interest according to embodiments of the present disclosure.

In order to implement foregoing embodiments, embodiments of the present disclosure further provide a device for labelling a point of interest. FIG. 4 is a block diagram illustrating a device for labelling a point of interest according to embodiments of the present disclosure.

As illustrated in FIG. 4, device for labelling a point of interest may include a first acquisition module 140, a n extracting module 420, a first determining module 430 and a labelling module 440.

The first acquisition module 410 is configured to obtain image data to be labelled. The image data includes an image to be labelled and a collection location of the image to be labelled.

The extracting module 420 is configured to perform feature extraction on the image to be labelled to obtain a first image feature of the image to be labelled.

The first determining module 430 is configured to determine a first reference image corresponding to the image to be labelled based on a similarity between the first image feature and a second image feature corresponding to a reference image in an image library.

The labeling module 440 is configured to label a point of interest of the image to be labelled based on a category of the first reference image and the collection location of the image to be labelled.

In a possible implementation of embodiments, the device further includes a second acquisition module.

The second acquisition module is configured to preprocess the image to be labelled to obtain a candidate labelled region from the image to be labelled.

The extracting module 420 is configured to perform feature extraction on the candidate labelled region.

In a possible implementation of embodiments, the image to be labelled includes at least two candidate labelled regions, and the first candidate labelled region is overlapped with the second candidate labelled region.

The device further includes a first judging module and a fusing module.

The first judging module is configured to determine whether a ratio of an area of an overlapped region to an area of the first candidate labelled region is greater than a threshold, and/or whether a ratio of an area of the overlapped region to an area of the second candidate labelled region is greater than a threshold.

The fusing module is configured to perform a fusion operation on the first candidate labelled region and the second candidate labelled region to obtain a fused candidate labelled region, when the ratio of the area of the overlapped region to the area of the first candidate labelled region is greater than the threshold, and/or the ratio of the overlapped region to the area of the second candidate labelled region is greater than the threshold.

The extracting module 420 is configured to perform the feature extraction on the fused candidate labelled region.

In a possible implementation of embodiments, the device further includes a recording module. The recording module is configured to record the category and the collection location of the image to be labelled in the image library.

In a possible implementation of embodiments, the image data further includes collection parameters of the image to be labelled.

The device further includes a second judging module and a second determining module.

The second judging module is configured to determine whether a collection location and a collection parameter of each reference image in the image library match the collection location and the collection parameter of the image to be labelled respectively.

The second determining module is configured to determine that the collection location of the second reference image in the image library is invalid, when the collection location of the second reference image in the image library matches the collection location of the image to be labelled, and the collection parameter of the second reference image matches the collection parameter of the image to be labelled.

It should be noted that the above-mentioned explanation and description of the embodiment of the method for labelling a point of interest is also applicable to the device for labelling a point of interest according to embodiments of the present disclosure, which is not repeated here.

With the device for labelling a point of interest according to embodiments of the present application, by extracting the first image feature of the image to be labelled and determining the first reference image corresponding to the image to be labelled based on similarity between the first image feature and the second image feature corresponding to the reference image in the image library, the point of interest of the image to be labelled is labelled based on the category of the first reference image and the collection location of the image to be labelled. This device may determine, from the image library, the reference image of a known category corresponding to the image to be labelled based on the similarity between images, and automatically labels the category and location for the image to be labelled based on the category of the reference image and the collection location of the image to be labelled. Therefore, this device not only improves labeling efficiency, but also labels the collection location of the image to be labelled for subsequent map updates.

In order to implement the foregoing embodiments, embodiments of the present disclosure further provide a computer device including a processor and a memory.

The processor is configured to run the program corresponding to an executable program code by reading the executable program code stored in the memory, such that a method for labelling a point of interest according to embodiments is implemented.

Figure 5:
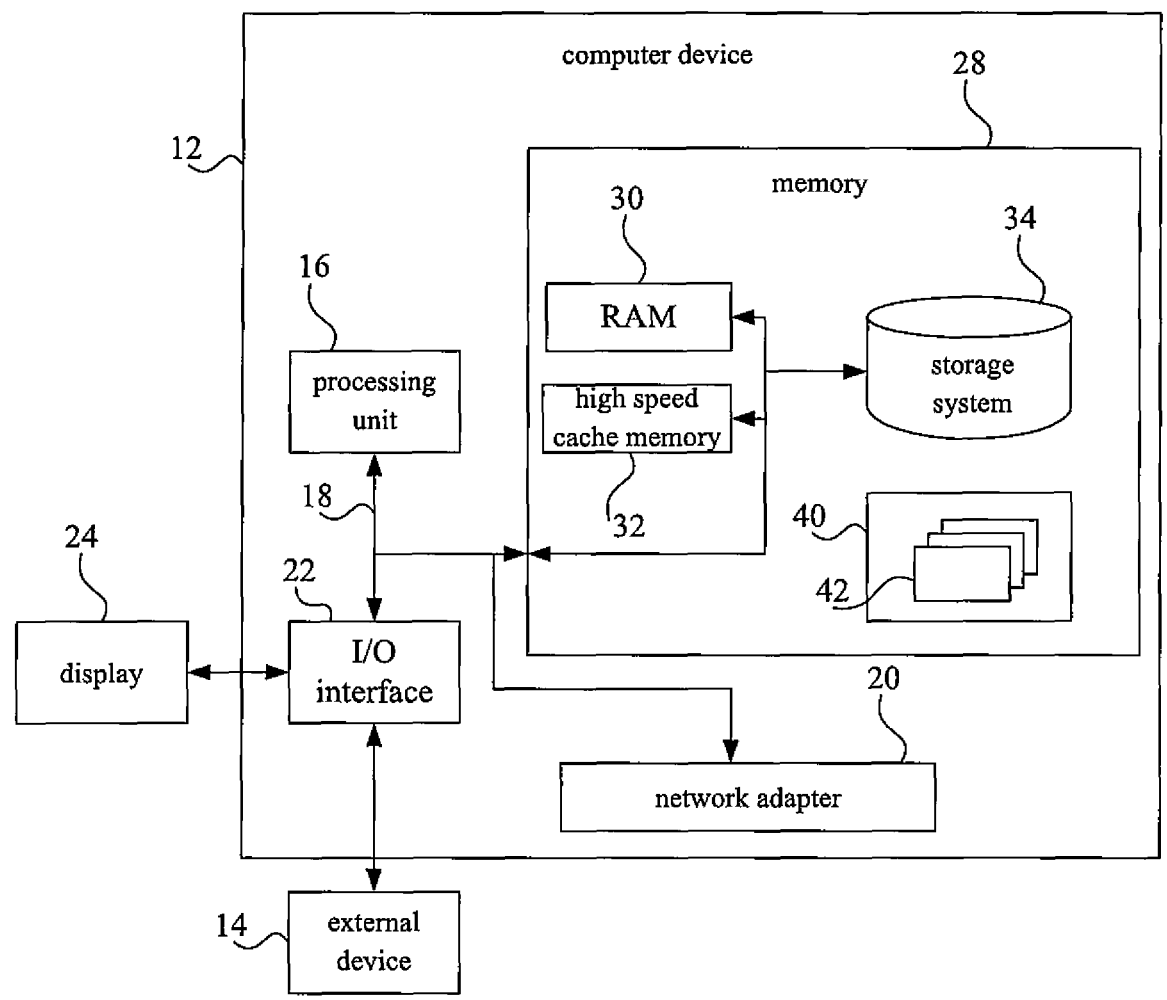
FIG. 5 is a block diagram illustrating an exemplary computer device suitable for implementing embodiments of the present disclosure.

FIG. 5 is a block diagram illustrating an exemplary computer device suitable for implementing embodiments of the present disclosure. The computer device 12 illustrated in FIG. 5 is merely an example, and should not impose any limitation on the functions and scope of use of the embodiments of the present disclosure.

As illustrated in FIG. 5, the computer device 12 is represented in the form of a general-purpose computing device. The components of the computer device 12 may include, but are not limited to, one or more processors or processing units 16, a system memory 28, and a bus 18 connecting different system components (including the system memory 28 and the processing unit 16).

The bus 18 represents one or more of several bus structures, including a storage bus or a storage controller, a peripheral bus, an accelerated graphics port and a processor or a local bus with any bus structure in the plurality of bus structures. For example, these architectures include but not limited to an ISA (Industry Standard Architecture) bus, a MAC (Micro Channel Architecture) bus, an enhanced ISA bus, a VESA (Video Electronics Standards Association) local bus and a PCI (Peripheral Component Interconnection) bus.

The computer device 12 typically includes various computer system readable mediums. These mediums may be any usable medium that may be accessed by the computer device 12, including volatile and non-volatile mediums, removable and non-removable mediums.

The system memory 28 may include computer system readable mediums in the form of volatile medium, such as a RAM (Random Access Memory) 30 and/or a cache memory 32. The computer device 12 may further include other removable/non-removable, volatile/non-volatile computer system storage mediums. Only as an example, the storage system 34 may be configured to read from and write to non-removable, non-volatile magnetic mediums (not illustrated in FIG. 5, and usually called "a hard disk driver"). Although not illustrated in FIG. 5, a magnetic disk driver configured to read from and write to the removable non-volatile magnetic disc (such as "a diskette"), and an optical disc driver configured to read from and write to a removable non-volatile optical disc (such as a CD-ROM, a DVD-ROM or other optical mediums) may be provided. Under these circumstances, each driver may be connected with the bus 18 by one or more data medium interfaces. The system memory 28 may include at least one program product. The program product has a set of program modules (for example, at least one program module), and these program modules are configured to execute functions of respective embodiments of the present disclosure.

A program/utility tool 40, having a set (at least one) of program modules 42, may be stored in the system memory 28. Such program modules 42 include but not limited to an operating system, one or more application programs, other program modules, and program data. Each or any combination of these examples may include an implementation of a networking environment. The program module 42 usually executes functions and/or methods described in embodiments of the present disclosure.

The computer device 12 may communicate with one or more external devices 14 (such as a keyboard, a pointing device, and a display 24), may further communicate with one or more devices enabling a user to interact with the device, and/or may communicate with any device (such as a network card, and a modem) enabling the computer device 12 to communicate with one or more other computer devices. Such communication may occur via an Input/Output (I/O) interface 22. Moreover, the computer device 12 may further communicate with one or more networks (such as LAN (Local Area Network), WAN (Wide Area Network) and/or public network, such as Internet) via a network adapter 20. As illustrated in FIG. 5, the network adapter 20 communicates with other modules of the computer device 12 via the bus 18. It should be understood that, although not illustrated in FIG. 7, other hardware and/or software modules may be used in combination with the computer device 12, including but not limited to: microcode, device drivers, redundant processing units, external disk drive arrays, RAID (Redundant Array of Independent Disks) systems, tape drives, and data backup storage systems, etc.

The processing unit 16, by operating programs stored in the system memory 28, executes various function applications and data processing, for example implements the high-precision map generation method provided in embodiments of the present disclosure.

In order to implement the above embodiments, an embodiment of the present disclosure further provides a non-transitory computer-readable storage medium on which a computer program is stored. When the program is executed by a processor, the interest point labeling method according to the foregoing embodiment is implemented.

In addition, terms such as "first" and "second" are used herein for purposes of description and are not intended to indicate or imply relative importance or significance. Thus, the feature defined with "first" and "second" may comprise one or more this feature. In the description of the present disclosure, "a plurality of" means at least two, for example, two or three, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

It would be understood by those skilled in the art that all or a part of the steps carried by the method in the above-described embodiments may be completed by relevant hardware instructed by a program. The program may be stored in a computer readable storage medium. When the program is executed, one or a combination of the steps of the method in the above-described embodiments may be completed.

In addition, individual functional units in the embodiments of the present disclosure may be integrated in one processing module or may be separately physically present, or two or more units may be integrated in one module. The integrated module as described above may be achieved in the form of hardware, or may be achieved in the form of a software functional module. If the integrated module is achieved in the form of a software functional module and sold or used as a separate product, the integrated module may also be stored in a computer readable storage medium.

The storage medium mentioned above may be read-only memories, magnetic disks or CD, etc. Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. A method for labelling a point of interest, comprising:
obtaining image data to be labelled, wherein the image data comprises an image to be labelled and a collection location of the image to be labelled;
performing feature extraction on the image to be labelled to obtain a first image feature of the image to be labelled;
determining a first reference image corresponding to the image to be labelled based on a similarity between the first image feature and a second image feature corresponding to each reference image in an image library; and
labeling a point of interest of the image to be labelled with a category of the first reference image and the collection location of the image to be labelled;
wherein the method further comprises:
tailoring the image to be labelled with a pre-trained POI recognition model to obtain a candidate labelled region from the image to be labelled, wherein the image to be labelled at least comprises a first candidate labelled region and a second candidate labelled region, and the first candidate labelled region is overlapped with the second candidate labelled region;
determining whether a first ratio of an area of an overlapped region to an area of the first candidate labelled region is greater than a threshold, and/or whether a second ratio of the area of the overlapped region to an area of the second candidate labelled region is greater than the threshold;
when the first ratio and/or the second ratio is greater than the threshold, performing a fusion operation on the first candidate labelled region and the second candidate labelled region to obtain a fused candidate labelled region; and
performing the feature extraction on the fused candidate labelled region.

2. The method according to claim 1, wherein labeling a point of interest of the image to be labelled comprises:
in response to determining first reference images, labeling the point of interest with a candidate category and the collection location of the image to be labelled, wherein the candidate category corresponds to a maximum number of first reference images.

3. The method according to claim 1, further comprising:
recording a category of the image to be labelling and the collection location of the image to be labelled in the image library.

4. The method according to claim 1, wherein the image data further comprises a collection parameter of the image to be labelled; and
wherein the method further comprises:
determining whether the collection location and the collection parameter of each reference image in the image library match the collection location and the collection parameter of the image to be labelled respectively; and
when the collection location of the second reference image in the image library matches the collection location of the image to be labelled, and the collection parameter of the second reference image matches the collection parameters of the image to be labelled, determining that the collection location of the second reference image in the image library is invalid.

5. A computer device, comprising a processor and a memory, wherein the processor is configured to run programs corresponding to executable program codes by reading the executable program codes stored in the memory, to:
obtain image data to be labelled, wherein the image data comprises an image to be labelled and a collection location of the image to be labelled;
perform feature extraction on the image to be labelled to obtain a first image feature of the image to be labelled;
determine a first reference image corresponding to the image to be labelled based on a similarity between the first image feature and a second image feature corresponding to each reference image in an image library; and
label a point of interest of the image to be labelled with a category of the first reference image and the collection location of the image to be labelled;
wherein the processor is further configured to:
tailor the image to be labelled with a pre-trained POI recognition model to obtain a candidate labelled region from the image to be labelled, wherein the image to be labelled at least comprises a first candidate labelled region and a second candidate labelled region, and the first candidate labelled region is overlapped with the second candidate labelled region;
determine whether a first ratio of an area of an overlapped region to an area of the first candidate labelled region is greater than a threshold, and/or whether a second ratio of the area of the overlapped region to an area of the second candidate labelled region is greater than the threshold;
when the first ratio and/or the second ratio is greater than the threshold, perform a fusion operation on the first candidate labelled region and the second candidate labelled region to obtain a fused candidate labelled region; and
perform the feature extraction on the fused candidate labelled region.

6. The computer device according to claim 5, wherein the processor is further configured to:
in response to determining first reference images, label the point of interest with a candidate category and the collection location of the image to be labelled, wherein the candidate category corresponds to a maximum number of first reference images.

7. The computer device according to claim 5, wherein the processor is further configured to:
  record a category of the image to be labelling and the collection location of the image to be labelled in the image library.

8. The computer device according to claim 5, wherein the image data further comprises a collection parameter of the image to be labelled; and
  the processor is further configured to:
  determine whether the collection location and the collection parameter of each reference image in the image library match the collection location and the collection parameter of the image to be labelled respectively; and
  when the collection location of the second reference image in the image library matches the collection location of the image to be labelled, and the collection parameter of the second reference image matches the collection parameters of the image to be labelled, determine that the collection location of the second reference image in the image library is invalid.

9. A non-transitory computer-readable storage medium having a computer program stored thereon, wherein when the program is executed by a processor, a method for labelling a point of interest is implemented, the method comprising:
  obtaining image data to be labelled, wherein the image data comprises an image to be labelled and a collection location of the image to be labelled;
  performing feature extraction on the image to be labelled to obtain a first image feature of the image to be labelled;
  determining a first reference image corresponding to the image to be labelled based on a similarity between the first image feature and a second image feature corresponding to each reference image in an image library; and
  labeling a point of interest of the image to be labelled with a category of the first reference image and the collection location of the image to be labelled;
  wherein the method further comprises:
  tailoring the image to be labelled with a pre-trained POI recognition model to obtain a candidate labelled region from the image to be labelled, wherein the image to be labelled at least comprises a first candidate labelled region and a second candidate labelled region, and the first candidate labelled region is overlapped with the second candidate labelled region;
  determining whether a first ratio of an area of an overlapped region to an area of the first candidate labelled region is greater than a threshold, and/or whether a second ratio of the area of the overlapped region to an area of the second candidate labelled region is greater than the threshold;
  when the first ratio and/or the second ratio is greater than the threshold, performing a fusion operation on the first candidate labelled region and the second candidate labelled region to obtain a fused candidate labelled region; and
  performing the feature extraction on the fused candidate labelled region.

10. The non-transitory computer-readable storage medium according to claim 9, wherein labeling a point of interest of the image to be labelled comprises:
  in response to determining first reference images, labeling the point of interest with a candidate category and the collection location of the image to be labelled, wherein the candidate category corresponds to a maximum number of first reference images.

11. The non-transitory computer-readable storage medium according to claim 9, wherein the method further comprises:
  recording a category of the image to be labelling and the collection location of the image to be labelled in the image library.

12. The non-transitory computer-readable storage medium according to claim 9, wherein the image data further comprises a collection parameter of the image to be labelled; and
  wherein the method further comprises:
  determining whether the collection location and the collection parameter of each reference image in the image library match the collection location and the collection parameter of the image to be labelled respectively; and
  when the collection location of the second reference image in the image library matches the collection location of the image to be labelled, and the collection parameter of the second reference image matches the collection parameters of the image to be labelled, determining that the collection location of the second reference image in the image library is invalid.

* * * * *